(12) United States Patent
Roberts et al.

(10) Patent No.: US 7,927,485 B2
(45) Date of Patent: Apr. 19, 2011

(54) SYSTEM FOR FILTERING WATER OR WASTEWATER

(75) Inventors: R. Lee Roberts, Chadds Ford, PA (US);
Mark Kevin Addison, Bear, DE (US);
Karl Michael Kyriss, West Chester, PA (US)

(73) Assignee: RG Delaware, Inc., Wilmington, DE (US)

( * ) Notice: Subject to any disclaimer, the term of this patent is extended or adjusted under 35 U.S.C. 154(b) by 421 days.

(21) Appl. No.: 12/155,287

(22) Filed: Jun. 2, 2008

(65) Prior Publication Data
US 2009/0294370 A1 Dec. 3, 2009

(51) Int. Cl.
*C02F 1/52* (2006.01)
(52) U.S. Cl. ............... 210/195.3; 210/205; 210/220; 210/221.1; 210/265; 210/519; 210/522
(58) Field of Classification Search ............... 210/715
See application file for complete search history.

(56) References Cited

U.S. PATENT DOCUMENTS

| | | | |
|---|---|---|---|
| 2,179,246 A * | 11/1939 | Applebaum | 210/208 |
| 3,068,172 A | 12/1962 | Leviel et al. | |
| 3,788,981 A | 1/1974 | Richard et al. | |
| 4,156,644 A | 5/1979 | Richard | |
| 4,164,471 A | 8/1979 | Hutchinson, deceased et al. | |
| 4,765,891 A | 8/1988 | Wyness | |
| 5,089,136 A * | 2/1992 | Cyr | 210/519 |
| 5,143,625 A | 9/1992 | Ballard | |
| 5,804,062 A * | 9/1998 | Wyness | 210/86 |
| 6,171,498 B1 | 1/2001 | Fassbender et al. | |
| 6,354,328 B1 | 3/2002 | Roberts | |
| 6,371,308 B1 | 4/2002 | Zhou | |
| 7,270,750 B2 | 9/2007 | Galland et al. | |
| 7,303,686 B2 | 12/2007 | Mackrle et al. | |

OTHER PUBLICATIONS

Infilco Degremont "Superpulsator® Clarifier"; pp. 1 to 4, Dec. 2002.
Infilco Degremont "DensaDeg® High Rate Clarifier and thickner"; pp. 1 to 4, Dec. 2002.
US Filter "Spiracone® Sludge Blanket Clarifier for Water Treatment"; pp. 1 to 4, 1999.
High Rate Pulsed Sludge Blanket Clarifier Performance on Rivers and Reservoirs with Widely Different Raw Water Characteristic in Texas and United States, pp. 1 to 13.

* cited by examiner

*Primary Examiner* — Peter A Hruskoci
(74) *Attorney, Agent, or Firm* — Merek, Blackmon & Voorhees, LLC

(57) ABSTRACT

A filter system for filtering water and/or wastewater including a sludge blanket clarifier for removing at least some impurities from influent. The sludge blanket clarifier includes a clarifier compartment in which a sludge blanket is to be formed to remove at least some impurities from influent directed into the clarifier compartment and through the sludge blanket. The clarifier compartment has at least one vertical sidewall extending from a bottom of the clarifier compartment to a top of the clarifier compartment. The clarifier compartment has a cross-sectional area that varies over at least a portion of a height of the clarifier compartment such that the velocity of influent just prior to entry into the sludge blanket is less than the velocity of influent just after entering the clarifier compartment.

29 Claims, 8 Drawing Sheets

SYSTEM FOR FILTERING WATER OR WASTEWATER

FIELD OF THE INVENTION

The present invention is directed to water and/or wastewater filter systems for filtering impurities from a liquid. More particularly, the present invention is directed to filter systems that use a sludge blanket as a filtering or clarifying component, i.e., a component that removes at least some impurities from a fluid to be filtered or clarified. The sludge blanket could be the sole filtering or clarifying component or one of a plurality of filtering or clarifying components.

BACKGROUND OF THE INVENTION

Various filter systems have been developed to filter water and wastewater. Typical filter systems include but are not limited to upflow filters/clarifiers, downflow filter/clarifiers and bi-flow filters as well as various combinations of the aforementioned filter systems. The terms filter and clarifier are used interchangeably herein and refer to a structure in which influent is directed through to remove at least some impurities. An upflow filter/clarifier is a structure in which influent is directed in an upward path to remove impurities. Conversely, the term downflow filter/clarifier refers to a structure in which the influent is directed in a downward path to remove impurities. A bi-flow filter/clarifier refers to a structure in which the influent is directed in both a downward path and an upward path to remove impurities. The upflow filters/clarifiers, downflow filters/clarifiers and bi-flow filters include one or more filter components.

A sludge blanket may be used as the filtering component in filter systems including but not limited to upflow filters/clarifiers. A sludge blanket is typically formed at a point of equilibrium between the lifting force of the influent traveling upwardly through a filter/clarifier and the counteracting gravitational force on the precipitates and/or flocculated particles in the influent. Specifically, at the point of equilibrium, the precipitates and/or flocculated particles gather and form a sludge blanket of a desired thickness and density. As influent travels through the sludge blanket, impurities in the influent are trapped in the sludge blanket.

Previously known sludge blanket filters/clarifiers suffer from a number of disadvantages. For example, prior known sludge blanket clarifiers do not have suitable means for effectively and efficiently evacuating sludge in the event that the sludge blanket should fall to the bottom of the filter or clarifier or an undesirable amount of sludge collects in the filter/clarifier. In existing systems, if the sludge blanket falls or an undesirable amount of sludge collects in prior known filters/clarifiers, the sludge is typically removed manually. This is a significant disadvantage as it undoubtedly leads to prolonged periods in which the filter/clarifier is rendered inoperable. Another disadvantage of prior known sludge blanket filters is the inability to uniformly distribute influent across the sludge blanket without the need for complex systems including vacuum systems. This again is a significant disadvantage. Specifically, if influent is not uniformly distributed across the entire area of the sludge blanket, the sludge blanket cannot filter to its maximum capacity. Moreover, if influent is concentrated in one or more small areas of the sludge blanket, holes can form in these areas of the sludge blanket. Obviously, influent passing through these holes in the sludge blanket will not be properly filtered.

Prior known devices employing a sludge blanket as a filtering component are also incapable of being readily retrofitted into existing filters. For example, if it was desired to convert an existing upflow filter using a bed of filter media as the filtering component to a filter that uses a sludge blanket as the filtering component, such conversion was not commercially practical with prior known devices. This is a significant disadvantage as an existing filter could not be used leading to the expenditure of considerable fluids for a new filter system.

Prior known sludge blanket clarifiers that employ a filter having a conical configuration require larger structures that undesirably increase the cost of the filter system. Prior known filter systems also cannot efficiently and cost effectively achieve a desired level of flocculation in the sludge blanket clarifier. Flocculation is the process in which impurities in the influent agglomerate making the impurities easier to filter. Previously known systems require excessive amounts of costly chemicals or other means to achieve a suitable level of flocculation.

OBJECTS AND SUMMARY OF THE INVENTION

An object of the present invention is to provide a novel and unobvious sludge blanket clarifier and methods of operating the same.

Another object of a preferred embodiment of the present invention is to provide a sludge blanket clarifier that includes a sludge removal system that can automatically and effectively remove undesired sludge in the clarifier.

A further object of a preferred embodiment of the present invention is to provide an sludge blanket clarifier with a configuration that causes the velocity of the influent to decrease from the time of entry into the clarifier to the time the influent passes into the sludge blanket to protect the sludge blanket, to aid in the uniform distribution of the influent across the sludge blanket and aid in flocculation.

Yet another object of a preferred embodiment of the present invention is to provide a flocculation module that maximizes flocculation.

Still another object of a preferred embodiment of the present invention is to provide a device that can be readily installed in existing filters/clarifiers to change a uniform cross-sectional area from the point of influent entry into the filter to the point influent enters the sludge blanket to a cross-sectional area that varies such that the velocity of the influent decreases from the time of entry into the filter to the time the influent passes into the sludge blanket to protect the sludge blanket, to aid in the uniform distribution of the influent across the sludge blanket and aid in flocculation.

Yet still another object of a preferred embodiment of the present invention is to provide a sludge blanket clarifier with a sludge removal system that can be readily cleaned by redirecting liquid from the influent piping through the sludge removal system to remove any blockages or obstructions in the sludge removal system.

A further object of a preferred embodiment of the present invention is to provide a sludge blanket clarifier that is able to reduce the velocity of the influent from the point of entry of influent into the clarifier to the point of entry of influent into the sludge blanket without significantly reducing the volume of the filtering compartment of the sludge blanket clarifier.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one preferred embodiment of the present invention is directed to a sludge blanket clarifier for removing at least some impurities from influent. The sludge blanket clarifier includes a clarifier compartment in which a sludge blanket is to be formed to remove at least some impurities from influent directed into the clarifier compartment and through the sludge blanket. The clarifier compartment has at least one vertical sidewall extending from a bottom of the clarifier compartment to a top of the clarifier compartment. The clarifier compartment has a cross-sectional area that varies over at least a portion of a height of the clarifier compartment such that the velocity of influent just prior to entry into the sludge blanket is less than the velocity of influent just after entering the clarifier compartment.

Another preferred embodiment of the present invention is directed to a sludge blanket clarifier for removing at least some impurities from influent. The sludge blanket clarifier includes a clarifier compartment in which a sludge blanket is to be formed to remove at least some impurities from influent directed into the clarifier compartment and through the sludge blanket. The clarifier compartment has a cross-sectional area that varies over at least a first portion of a height of the clarifier compartment such that the velocity of influent just prior to entry into the sludge blanket is less than the velocity of influent just after entering the clarifier compartment. The sludge blanket clarifier further includes a plurality of influent distribution conduits disposed in the clarifier compartment for directing influent to the sludge blanket.

A further preferred embodiment of the present invention is directed to a sludge blanket clarifier for removing at least some impurities from influent. The sludge blanket clarifier includes a clarifier compartment in which a sludge blanket is to be formed to remove at least some impurities from influent directed into the clarifier compartment and through the sludge blanket. The sludge blanket clarifier further includes an influent distribution chamber disposed in the clarifier compartment. The influent distribution chamber is configured to cause the velocity of influent to vary over at least a portion of the height of the influent distribution chamber. The sludge blanket clarifier further includes at least two influent distribution conduits operably associated with the influent distribution chamber for distributing influent through the clarifier compartment.

Still a further preferred embodiment of the present is directed to a sludge blanket clarifier for removing at least some impurities from influent. The sludge blanket clarifier includes a clarifier compartment in which a sludge blanket is to be formed to remove at least some impurities from influent directed into the clarifier compartment and through the sludge blanket. The sludge blanket clarifier further includes a plurality of influent distribution conduits for directing influent to the sludge blanket. The plurality of influent distribution conduits are disposed in the clarifier compartment. The sludge blanket clarifier further includes a plurality of sludge collection conduits for removing sludge from the clarifier compartment. The plurality of sludge collection conduits are disposed in the clarifier compartment.

Still another preferred embodiment of the present invention is directed to a sludge blanket clarifier for removing at least some impurities from influent. The sludge blanket clarifier includes a clarifier compartment in which a sludge blanket is to be formed to remove at least some impurities from influent directed into the clarifier compartment and through the sludge blanket. The sludge blanket clarifiers further includes a flocculator module disposed in the clarifier compartment. The flocculator module has at least one influent distribution member operably associated with a flexible flocculator baffle. The flexible flocculator baffle is configured such that when initially impacted with influent from the influent distribution member at least a portion of the flexible flocculator baffle moves to aid in flocculation.

Yet a further preferred embodiment of the present invention is directed to a sludge blanket clarifier for removing at least some impurities from influent. The sludge blanket clarifier includes a clarifier compartment in which a sludge blanket is to be formed to remove at least some impurities from influent directed into the clarifier compartment and through the sludge blanket. An influent chamber disposed in the clarifier compartment receives influent to be filtered and distributes the influent throughout the clarifier compartment. A sludge collection chamber disposed in the clarifier compartment collects sludge removed from a bottom of the clarifier compartment. The sludge collection chamber is disposed above the influent chamber. A concentrator disposed in the clarifier compartment receives excess sludge from the sludge blanket.

Another preferred embodiment of the present invention is directed to a sludge blanket clarifier for removing at least some impurities from influent. The sludge blanket clarifier includes a clarifier compartment in which a sludge blanket is to be formed to remove at least some impurities from influent directed into the clarifier compartment and through the sludge blanket. An influent inlet conduit is operably associated with the clarifier compartment for directing influent to be filtered into the clarifier compartment. A sludge collection member is disposed in the clarifier compartment for collecting unwanted sludge from the clarifier compartment. A sludge discharge conduit is operably associated with the sludge collection member for discharging sludge collected by the sludge collection member from the clarifier compartment. The sludge blanket clarifier further includes at least one connection conduit connecting the sludge discharge conduit to the influent inlet conduit and at least one valve operably associated with the connection conduit such that when the at least one valve is in a first position at least a portion of influent flowing through the influent inlet conduit is directed through the connection conduit, the sludge discharge conduit and the sludge collection member to free any blockages in the sludge discharge conduit and the sludge collection member.

A further preferred embodiment of the present invention is directed to a method of operating a sludge blanket clarifier to remove impurities from the influent. The method includes the steps of: (a) providing a clarifier compartment in which a sludge blanket is to be formed to remove at least some impurities from influent directed into the clarifier compartment and through the sludge blanket; (b) providing influent piping operably associated with the clarifier compartment for directing influent to be filtered into the clarifier compartment; (c) providing a volume of liquid in the clarifier compartment to create a static head; and, (d) directing at least a portion of the volume of liquid through the influent piping in a direction that is reverse to direction of flow of influent during filtration to free obstructions or blockages present in the influent piping.

Yet a further preferred embodiment of the present invention is directed to a sludge blanket clarifier for removing at least some impurities from influent. The sludge blanket clarifier includes a clarifier compartment in which a sludge blanket is to be formed to remove at least some impurities from influent directed into the clarifier compartment and through the sludge blanket. A plurality of influent distribution conduits are provided for directing influent to the sludge blanket. The plurality of influent distribution conduits are disposed in the clarifier compartment. A plurality of sludge collection conduits are provided for removing sludge from said clarifier compartment. The plurality of sludge collection conduits are disposed in the clarifier compartment. Valve means allows at least one additive to be directed into the clarifier compartment through the sludge collection conduits independent of influent being directed through the plurality of influent distribution conduits.

BRIEF DESCRIPTION OF THE DRAWINGS

FIG. 8 is an enlarged view of the flocculator module depicted in FIG. 7.

DETAILED DESCRIPTION OF THE PREFERRED EMBODIMENTS OF THE INVENTION

The preferred forms of the invention will now be described with reference to FIGS. 1-11. The appended claims are not limited to the preferred forms and no term and/or phrase used herein is to be given a meaning other than its ordinary meaning unless it is expressly stated that the term and/or phrase shall have a special meaning. The terms filter and clarifier as used herein are to be broadly interpreted to include a structure in which at least a portion of the impurities in a liquid are removed including but not limited to a clarifier, a polishing filter and/or a contactor.

FIGS. 1-8

Referring to FIGS. 1 to 8, a filter system A for filtering water and/or wasterwater formed in accordance with a preferred embodiment of the present invention is illustrated in one of many possible configurations. The filter system A, as explained in more detail below, employs a sludge blanket as the filtering component to remove impurities from the fluid to be filtered. The filter system A includes a clarifier compartment B in which the sludge blanket is formed. Preferably, the clarifier compartment B has a substantially rectangular cross-section.

Figure 3:
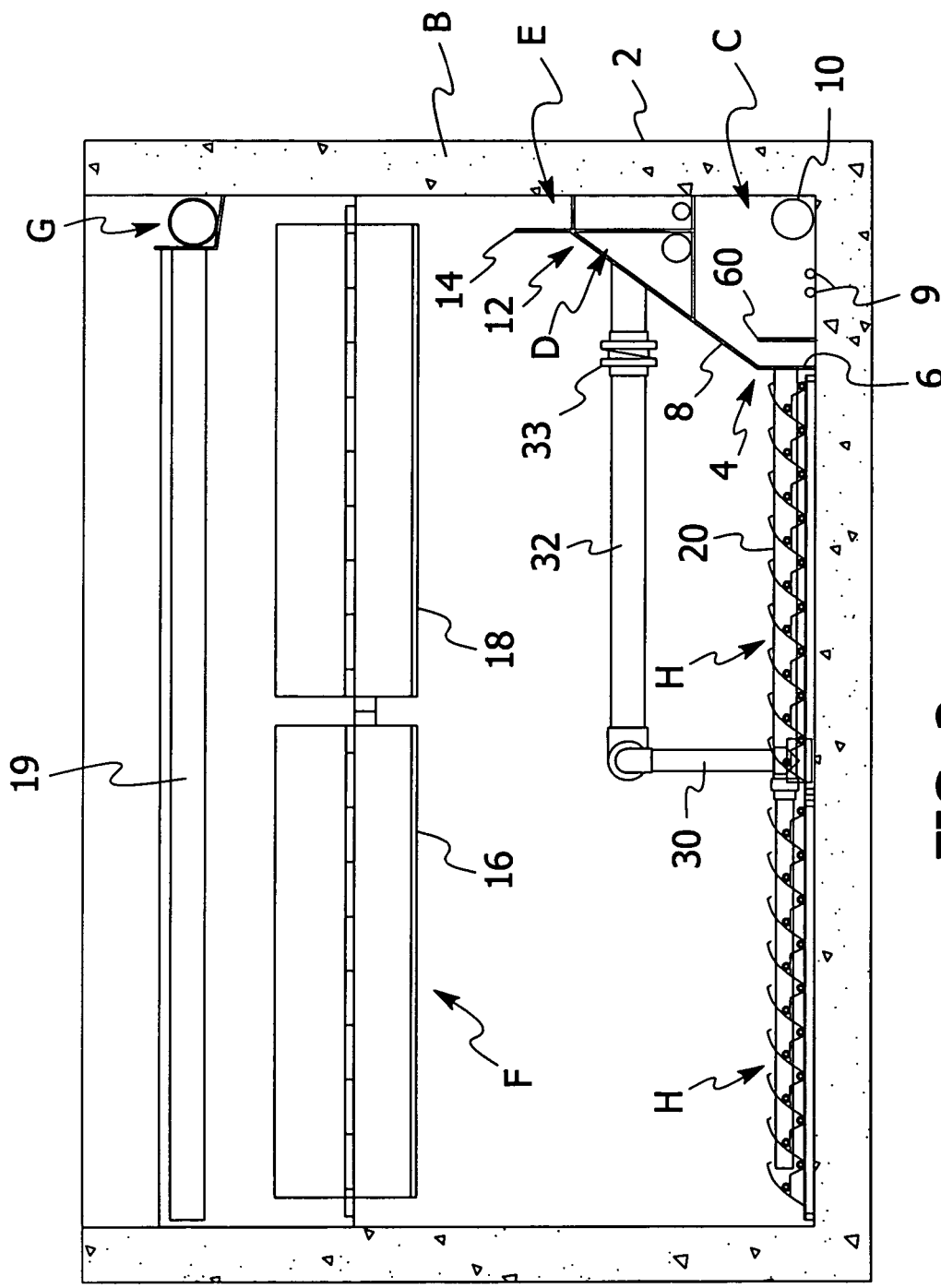
FIG. 3 is a cross-sectional view taken along lines 3-3 illustrated in FIG. 2.

Referring to FIG. 3, clarifier compartment B includes an influent distribution chamber C that extends substantially the entire length of sidewall 2 of clarifier compartment B. Preferably, influent distribution chamber C is configured such that it can be readily installed in an existing clarifier or filter. For example, influent distribution chamber C could be manufactured as a separate component in long sections and subsequently cut to a particular length necessary for insertion into a given existing filter system. A plurality of punch-outs can be preformed in the influent distribution chamber C. Upon installation, the desired punch-outs can be removed to accommodate the connection of the influent distribution chamber C with components operably associated therewith. While a configuration that allows the influent distribution chamber to be installed in an existing filter is desired, it is by no means a requirement of the present invention.

As seen in FIG. 3, the width of influent distribution chamber C varies. Specifically, the left sidewall 4 preferably has a vertical section 6 and an outwardly inclined section 8. This configuration provides the clarifier compartment B with a varying cross-sectional area over the height of sidewall 4. Specifically, the cross-sectional area of the clarifier compartment B over the height of vertical section 6 is less than the cross-sectional area of clarifier compartment B over the height of outwardly inclined section 8. This change in cross-sectional area causes the velocity of the influent to drop over the height of inclined section 8. As such, the velocity of the influent entering the sludge blanket is less than the velocity of influent at the point of entry into the clarifier compartment B. The velocity change protects the sludge blanket, aids in the uniform distribution of the influent across the sludge blanket and aids in flocculation. Influent distribution chamber C may include one or more sludge collection laterals 9 to remove excess sludge collected in chamber C.

It should be noted that influent distribution chamber C occupies only a small fraction of the total volume of the clarifier compartment B. Hence, the preferred form of the present invention is able to achieve the desired drop in velocity of the influent as the influent travels upwardly in the clarifier compartment B without sacrificing a significant portion of the filtering volume of clarifier compartment B. It is desirable to maximize the volume of the clarifier to increase detention time which aids in the clarification process. The preferred form of the present invention is in sharp contrast to a conical shaped sludge blanket clarifier where a large portion of the potential volume of the clarifier is adversely impacted to achieve the desired drop in influent velocity. Specifically, the lower portion of the conical clarifier has a significantly reduced volume.

An influent inlet pipe 10 is operably connected to influent distribution chamber C to direct influent to be filtered into the influent distribution chamber C.

Clarifier compartment B includes a sludge collection chamber D that extends substantially the entire length of sidewall 2 of clarifier compartment B. Sludge collection chamber D is disposed directly above the influent distribution chamber C. Preferably, sludge collection chamber D is configured such that it can be readily installed in an existing clarifier or filter. For example, the sludge collection chamber can be manufactured as a separate component in long sections and subsequently cut to desired lengths for a given filter system. A plurality of punch-outs can be preformed in the sludge collection chamber D. Upon installation, the desired punch-outs can be removed to accommodate the connection of the sludge collection chamber D with components operably associated therewith. While a configuration that allows the sludge collection chamber to be installed in an existing filter is desired, it is by no means a requirement of the present invention.

As seen in FIG. 3, the width of sludge collection chamber D varies over its height. Specifically, the left sidewall 12 is inclined outwardly over its entire length. This configuration allows for a continued increase in the cross-sectional area of the clarifier compartment B relative to the bottom of clarifier compartment B and the influent distribution chamber C thereby providing even further reduction in the velocity of the influent as it travels upwardly in the clarifier compartment B. Again, it is noted that sludge collection chamber D occupies only a small portion of the total volume of clarifier compartment B. Accordingly, the desired drop in velocity of the influent can be achieved without sacrificing a significant portion of the potential filtering volume of clarifier compartment B.

Clarifier compartment B further includes a concentrator trough E that extends substantially the length of sidewall 2. The sludge blanket forms just below top 14 of concentrator E. As the filter A operates in the filtration mode, impurities in the influent are continuously trapped in the sludge blanket causing the sludge blanket to grow and pass over top 14 and into concentrator E. In this manner, excess sludge in the sludge blanket can be readily removed. Concentrator trough E may be provided with an adjustable weir to vary the height of trough E.

Figure 2:
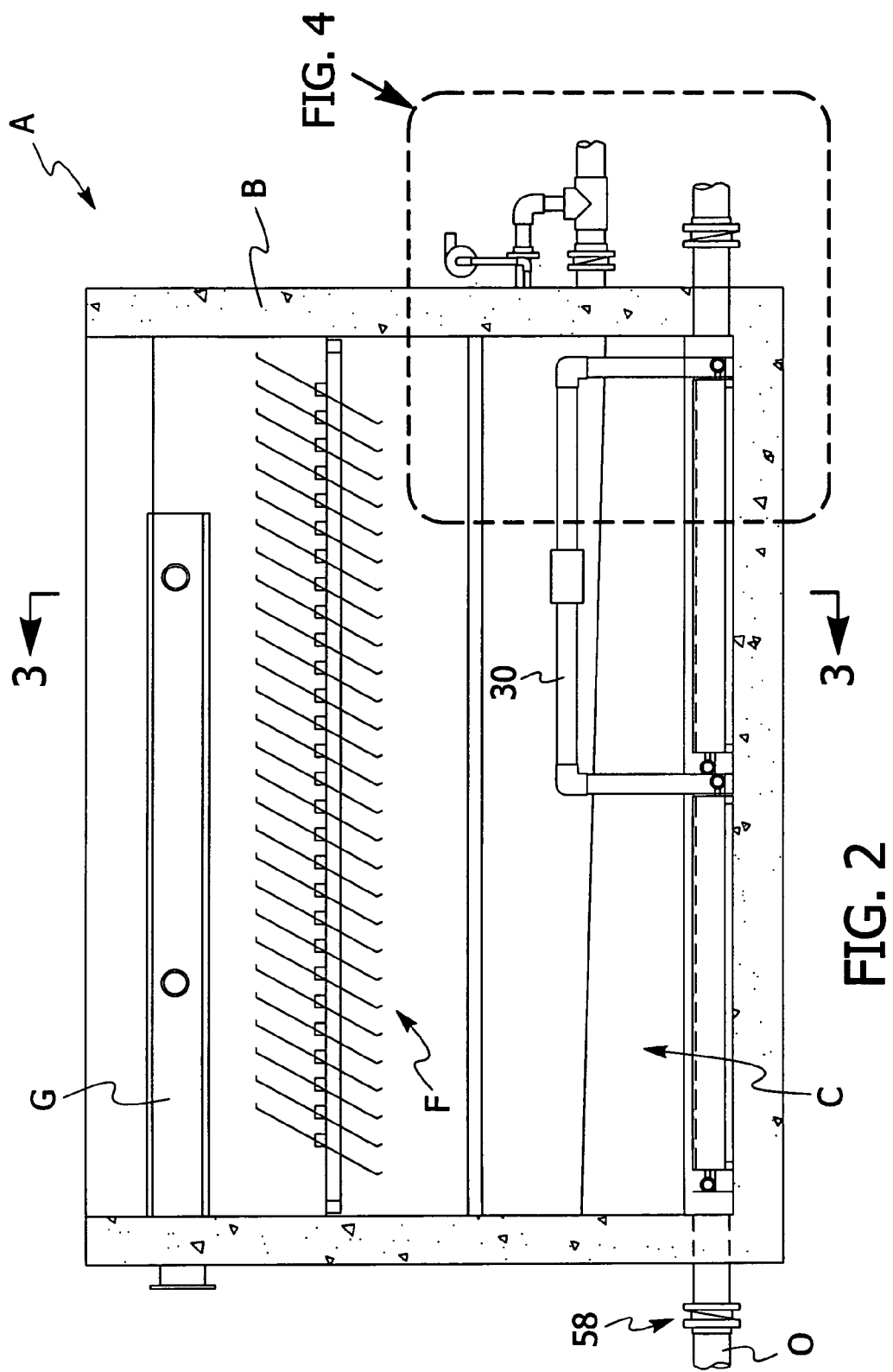
FIG. 2 is a cross-sectional view taken along lines 2-2 illustrated in FIG. 1.

Referring to FIGS. 2 and 3, clarifier compartment B further includes a settling assembly F. As seen in FIGS. 2 and 3, settling assembly F include two sets of inclined plates 16 and 18 preferably supported above the uppermost portion of the sludge blanket. As the influent travels upwardly above the sludge blanket, it passes through the settling assembly F. The settling assembly F will cause at least some impurities remaining in the influent to settle back into the sludge blanket. While the preferred form of the settling assembly F includes plates, it will be readily appreciated that other settling members including but not limited to settling tubes may be used. Further, the settling assembly F may be oriented such that the entire settling assembly F or a portion thereof extends into the sludge blanket.

Figure 1:
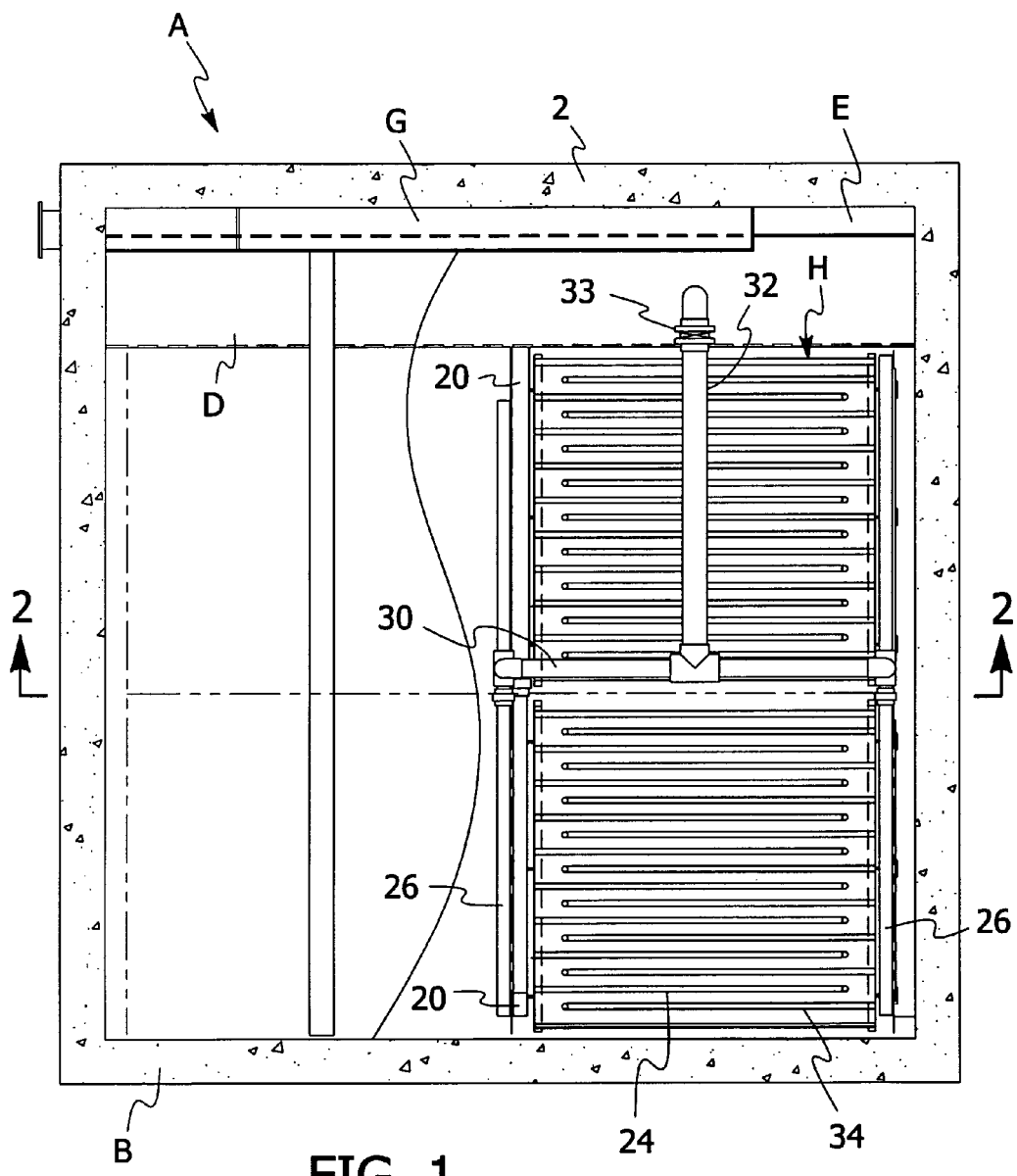
FIG. 1 is a plan view of a preferred embodiment of the present invention with portions thereof omitted for purposes of clarity.
Figure 5:
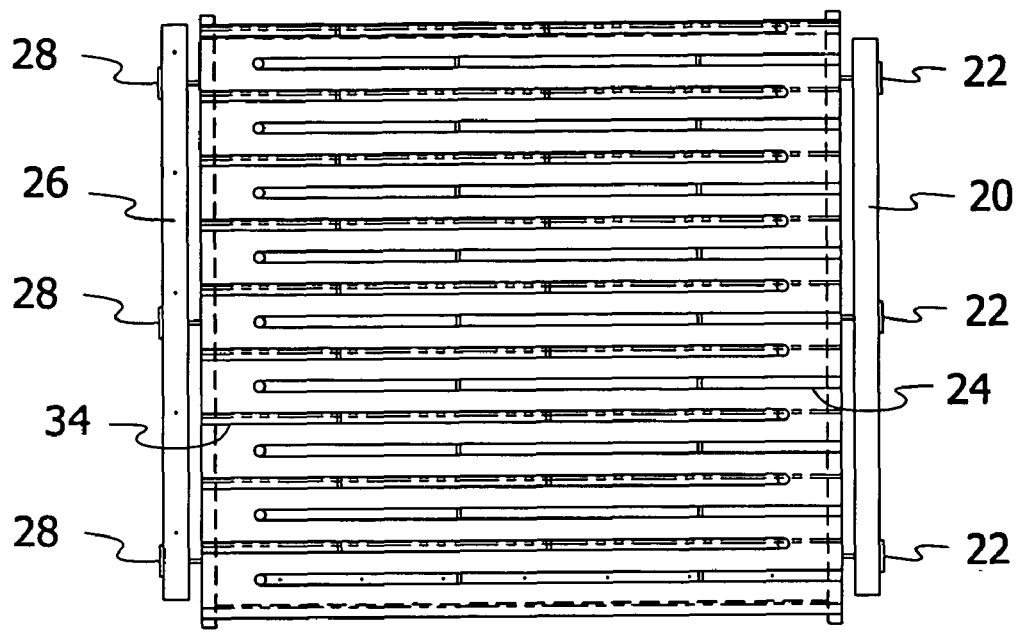
FIG. 5 is a plan view of a flocculator module formed in accordance with a preferred embodiment of the present invention.
Figure 6:
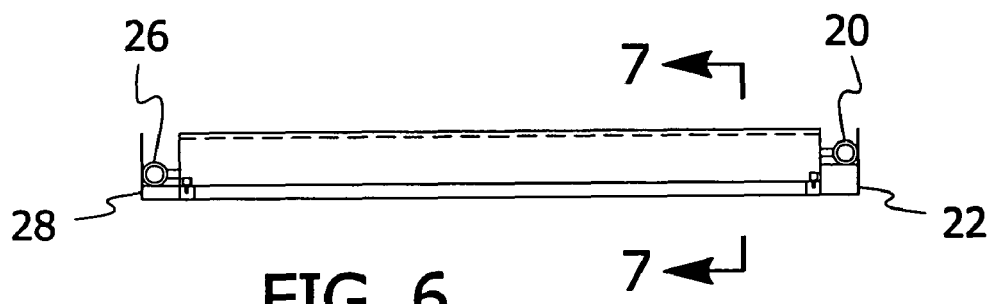
FIG. 6 is an elevation view of the flocculator module depicted in FIG. 5.
Figure 7:
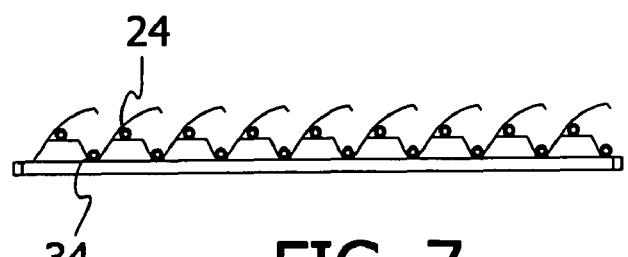
FIG. 7 is a cross-sectional view taken along lines 7-7 illustrated in FIG. 6.

Clarifier compartment B further includes an effluent trough G in which filtered water is collected and carried away to a predetermined location. One or more effluent collectors 19 may be connected to effluent trough G to assist in the collection and removal of effluent from clarifier compartment B. Referring to FIGS. 1 and 3, clarifier compartment B includes a pair of flocculator modules H in a side-by-side orientation. It should be noted that FIG. 1 only shows one flocculator module in its entirety and the sludge collection header of the second flocculator module. While two flocculator modules H are described, it will be readily appreciated that the number of flocculator modules H may be readily varied. Preferably, flocculator modules H are similar in construction and include an influent distribution header 20 connected to influent distribution chamber C. Referring to FIGS. 5 and 6, header 20 is supported by three spaced support members 22. A plurality of influent distribution laterals 24 extend outwardly from and at a ninety-degree angle to header 20. Flocculator modules H further include a sludge collection header 26 supported in a similar manner to header 20, i.e., by three spaced support members 28. Referring to FIGS. 1 and 2, sludge collection headers 26 of adjacent flocculator modules H are connected to each other via substantially U-shaped piping run 30. Piping run 30 is in turn connected to sludge collection chamber D via conduit 32. Conduit 32 includes a valve 33. A plurality of sludge collection laterals 34 extend outwardly from and at a ninety-degree angle to header 26.

Referring to FIG. 8, flocculator module H also includes a base 36 supporting a plurality of flexible flocculators I. Preferably, there is a flexible flocculator I associated with each influent distribution lateral 24 as seen in FIG. 8. Sludge collection laterals 34 positioned are positioned below and horizontally offset from influent distribution laterals 24. Each sludge collection lateral 34 includes a plurality of openings formed in the bottom thereof. The sludge collection laterals 34 are supported slightly above base 36 via sludge collection header 26 to allow sludge to freely flow into laterals 34.

Preferably, as shown in FIG. 8, flexible flocculator baffles I include a flexible arm 38 and a support platform 40. Flexible arm 38 includes a downwardly extending lip 42. Support platform 40 supports influent distribution laterals 24. Support platform 40 and flexible arm 38 form a substantially v-shaped junction area 44. Each of the influent distribution laterals 24 have a plurality of openings 46 spaced along the length of the lateral. Openings 46 are oriented downwardly at a forty-five degree angle to a vertical axis. Influent exiting laterals 24 is directed downwardly into the v-shaped junction area 44. As the influent flows out of the laterals 24, it impacts flexible arm 38 causing the arm to move. Movement of arm 38 imparts additional forces on the influent to aid in flocculation and distribution. Downwardly extending lip 42 also aids in flocculation and distribution of the influent as it increases turbulence. A pulsation system may be added to introduce the influent into clarifier compartment B so as to impart a pulsating action thereby imparting additional energy to flex or move arm 38. The pulsation system may be of the type used in Infilco Degremont Inc.'s SUPERPULSATOR® clarifier. However, it will be readily appreciated that any other means to pulsate the influent may be used.

Figure 4:
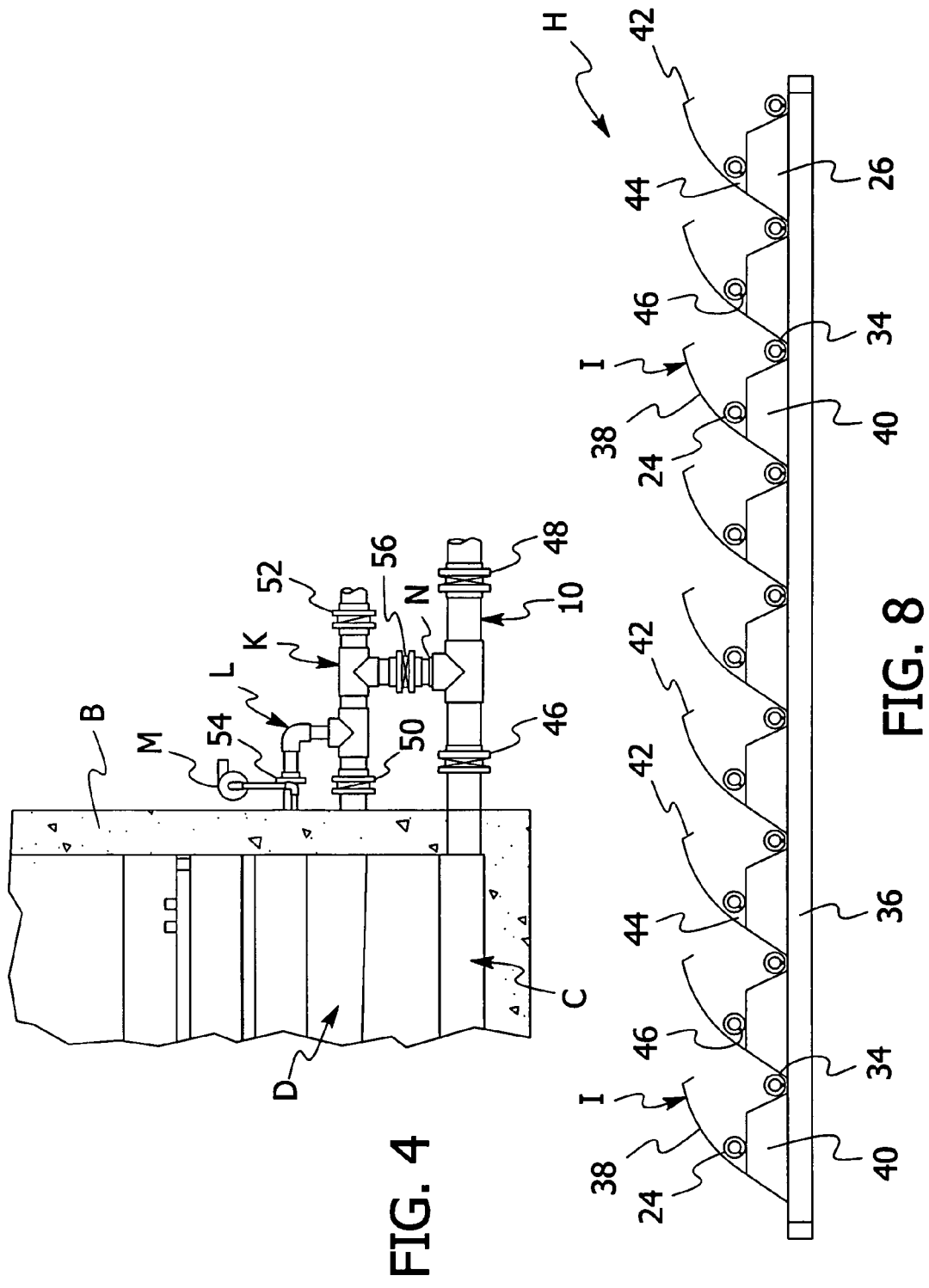
FIG. 4 is a fragmentary cross-sectional view showing in greater detail the external piping highlighted by the box depicted in FIG. 2.

Referring to FIG. 4, influent inlet conduit 10 directs the liquid to be filtered into influent distribution chamber C. Inlet conduit 10 has two spaced valves 46 and 48. A sludge discharge conduit K is connected to sludge collection chamber D. Discharge conduit K has two spaced valves 50 and 52. Concentrator discharge conduit L is connected at one end to concentrator trough E and at the other end to discharge conduit K. A recycle pump M is connected at one end to conduit L at the other end to inlet conduit 10. Conduit L has a valve 54. Conduit N connects inlet conduit 10 and discharge conduit K. Conduit N includes a valve 56. Referring to FIG. 2, an optional clean out conduit O having valve 58 may be provided.

During filtration, valves 46 and 48 are open and valves 33, 50, 52, 54, 56 and if present valve 58 are closed. Influent, i.e., the liquid/fluid to be filtered, is directed through inlet conduit 10 into influent distribution chamber C. Influent passes over influent baffle 60 disposed in influent distribution chamber C. Influent baffle 60 creates turbulence aiding flocculation and distribution. It should be noted that suitable chemicals may be added to the influent upstream of chamber C including but not limited to well known chemicals to promote flocculation. Influent passes from chamber C into influent headers 20. The influent headers 20 in turn direct the influent through the corresponding influent distribution laterals 24 and downwardly out openings 46. The influent passes upwardly around laterals 24 striking flexible arm 38 causing the same to move. Movement of flexible arm 38 imparts additional forces aiding in distribution of influent and flocculation. As previously explained, a sludge blanket is formed below top 14 of concentrator E. Influent travels through the sludge blanket. Impurities in the influent are trapped in the sludge blanket. As the influent continues to travel upwardly it passes through settling assembly F. Settling assembly F causes at least some of the impurities remaining in the influent to settle downwardly into the sludge blanket. As the sludge blanket grows during filtration, excess sludge runs into concentrator trough E. Effluent, i.e., filtered water is collected in effluent trough G and directed out of clarifier compartment B.

Sludge is preferably removed from clarifier compartment B, influent distribution chamber C and concentrator E in the manner described below. The need for sludge removal may arise from a number of circumstances including but not limited to the sludge blanket falling below the influent laterals 24 or excess sludge collecting in the bottom of clarifier compartment B, influent distribution chamber C and/or concentrator E. Prior to removal of sludge, valves 46, 48 and 56 are closed to cut-off the flow of influent through inlet pipe 10. The water level in clarifier compartment B is maintained at a desired level to create a desired static head. Valves 33, 50, 52 and 54 are opened. The static head in clarifier compartment B will drive the sludge through collection laterals 9 and 34, piping run 30, conduit 32, sludge collection chamber D, concentrator E and conduit K. It should be noted that collection laterals 9 in influent distribution chamber C are connected to conduit K upstream of valve 52. Sludge collection chamber D may be sloped downwardly in the direction of conduit K as shown in FIGS. 2 and 4 to assist the flow of sludge out of collection chamber D and into conduit K. Conduit K is connected to a waste/sludge storage vessel or other suitable means for storing waste/sludge. In this manner, sludge can be automatically removed from clarifier compartment B, influent distribution chamber C and/or concentrator trough E thereby obviating the need for the time consuming and labor intensive process of manually removing sludge. It should be noted that only a portion of the sludge collection system can be cleaned if desired. For example, if for some reason it is not desirable to clean concentrator E with the other components of the sludge collection system, valve 54 can be closed. Similarly, concentrator E can be cleaned by itself by closing either or both of valves 33 and 50 while valves 52 and 54 are open.

The preferred form of the present invention provides an effective and efficient manner of cleaning the sludge collection system including all piping as well as the sludge collection chamber to free any blockages or obstructions. Preferably, influent is used to clean the sludge collection system. However, filtered water can be used. To clean the sludge collection system, valves 46 and 52 are closed and valves 33, 48, 50 and 56 are opened. Influent will flow through inlet 10, conduit N, conduit K and into sludge collection chamber D. Influent will then flow through conduits 32, piping runs 30, headers 26 and laterals 34 in a direction opposite to the direction that sludge flows when removed from clarifier compartment B. The flow of the influent will free most if not all blockages or obstructions in the sludge collection system. The influent will be collected by the effluent collector 19 and trough G. When the sludge collection system is being cleaned, influent collected in the effluent trough G is directed to waste by a suitable piping and valve arrangement (not shown).

The preferred form of the present invention also provides for effective and efficient cleaning of the influent distribution system using static head in clarifier compartment B. Preferably, the influent distribution system is cleaned after undesired sludge has been removed in the manner described above. To clean the influent distribution system, valves 33, 48 and 50 are closed. The water level in clarifier compartment B is maintained at a desired level to create sufficient static head to drive the liquid remaining in the clarifier compartment B through the influent distribution system. Valves 46, 52 and 56 are opened. Due to the static head, influent will flow through the laterals 24, headers 20 and influent distribution chamber C. Influent will in turn flow from the influent distribution chamber C into conduits 10, N and K to waste. The flow of liquid will free most if not all blockages or obstructions in the influent distribution system. It should be noted that the flow of liquid during cleaning of the liquid influent distribution system is opposite to the direction of flow of influent during filtration.

Recycle pump M provides an efficient and effective manner of seeding the sludge blanket using sludge collected in concentrator E. Specifically, when recycle pump M is turned on, sludge from concentrator E is directed to inlet conduit 10. With valves 46 and 48 open, the sludge pumped from concentrator E is directed into clarifier compartment B to form a sludge blanket or enhance an existing sludge blanket.

The sludge collection system may also be used to introduce sludge or other additives (including but not limited to chemicals to promote flocculation) into the clarifier compartment B independent of the influent distribution system. This can be done at the same time that influent is being directed into the clarifier compartment B or at a time when influent is not flowing into clarifier compartment B. For example, during influent flow into clarifier compartment B with the valves in the positions described above for filtration with the sole exception of valves 33, 50 and 52 being open as opposed to closed, sludge or other additives can be directed into sludge discharge conduit K through sludge collection chamber D, conduit 32, piping run 30 and out collection laterals 34 into clarifier compartment B. It should be noted that flow through collection laterals 9 may be permitted or prevented during this process with a suitable valve arrangement. This process allows for sludge or other additive to be evenly distributed throughout the clarifier independent of the influent flow. Another advantage is that the sludge collection system is less likely to become clogged from the sludge or other additive being directed into the clarifier compartment B due to the fact that the openings in the sludge laterals 34 are larger than the openings in the influent laterals 24.

Optional clean out conduit O may be used to clean the influent distribution system and/or the sludge collection system. Specifically, filtered or unfiltered water can be directed through conduit O and into clarifier compartment B to clean the influent distribution system and/or the sludge collection system.

It should be noted that the preferred form of the present invention allows for the performance of the sludge blanket to be enhanced by additives such as powdered activated carbon (PAC) or suitable polymers. The use of PAC in sludge blankets has been limited due to the concern that the sludge blanket may fall from the added weight of this performance enhancing additive. The preferred form of the present invention obviates this concern by providing an efficient and effective manner of removing the sludge blanket should it fall below the influent distribution laterals.

Figure 9:
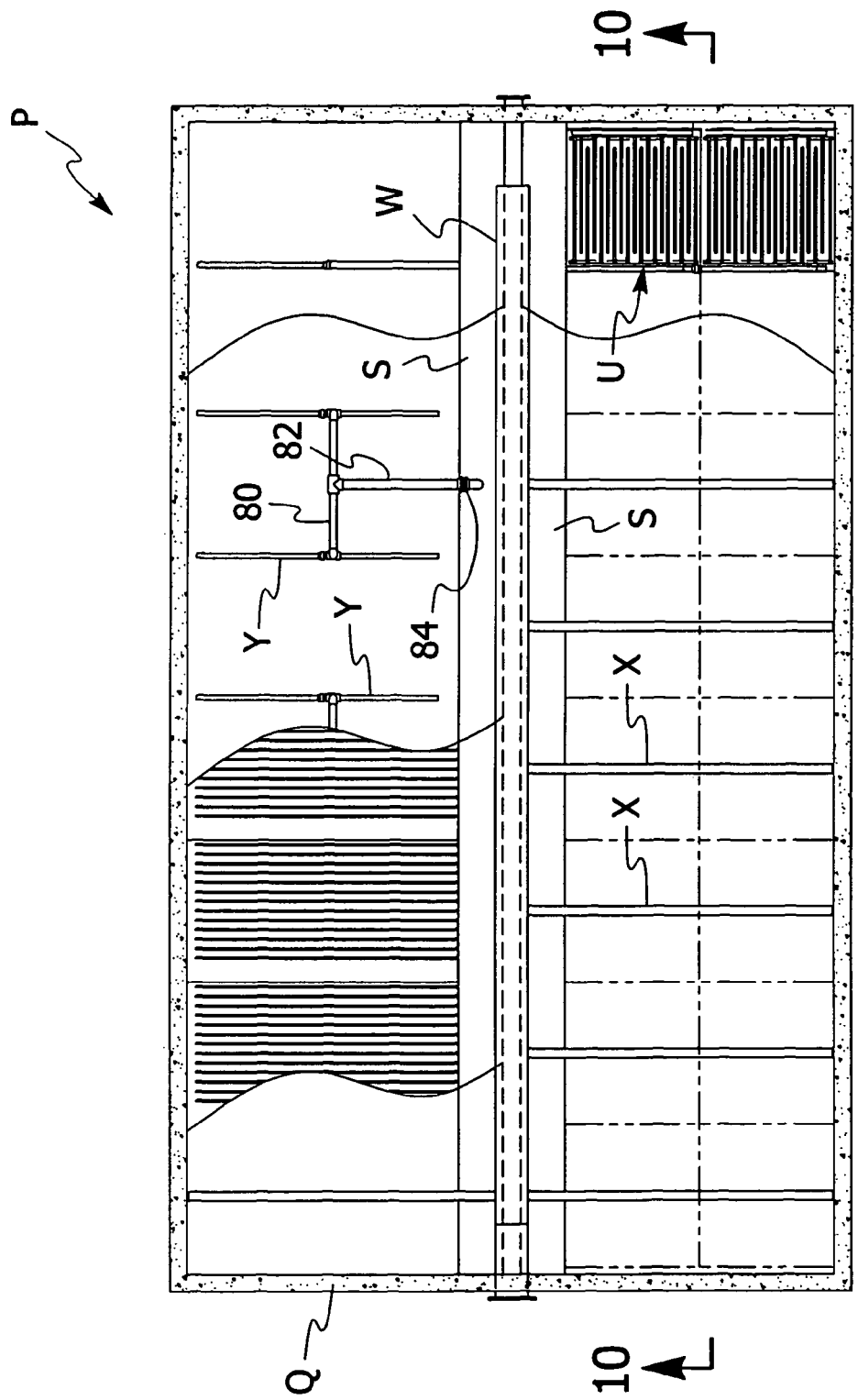
FIG. 9 is a plan view of another preferred embodiment of the present invention.
Figure 10:
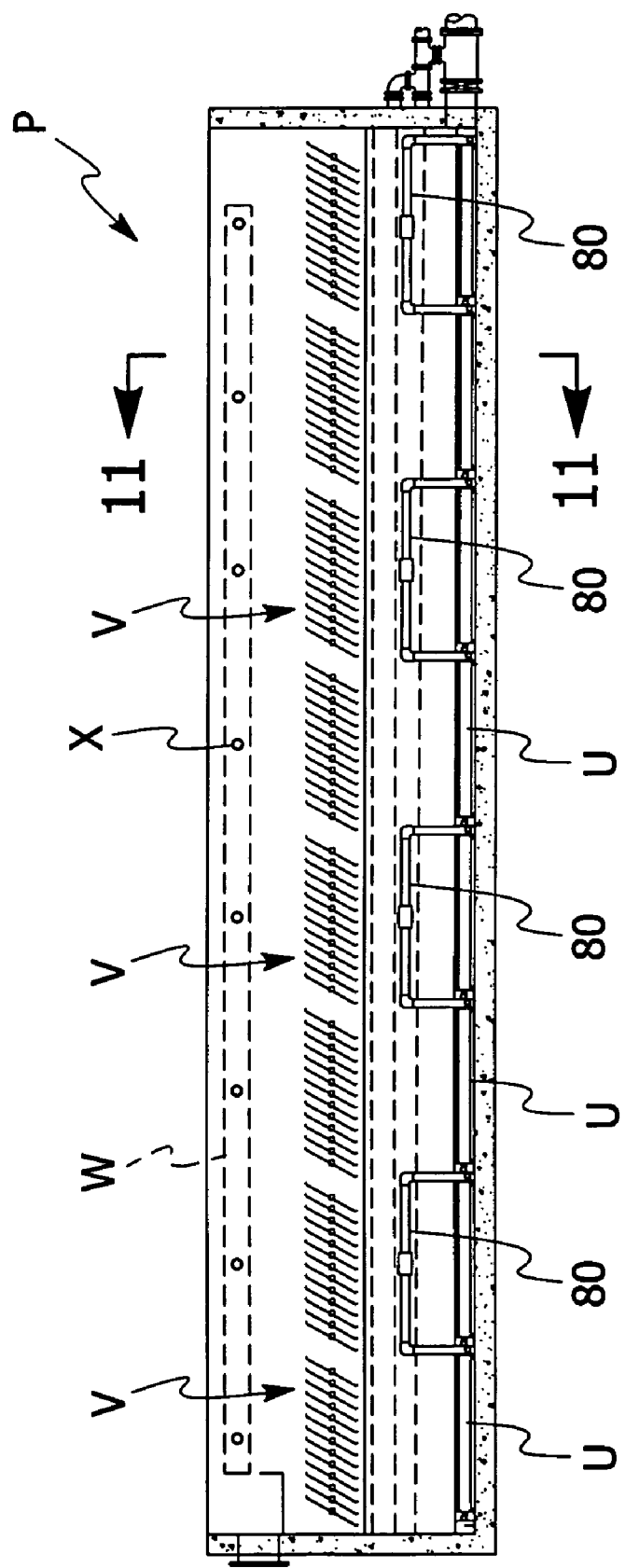
FIG. 10 is a cross-sectional view taken along lines 10-10 illustrated in FIG. 9.
Figure 11:
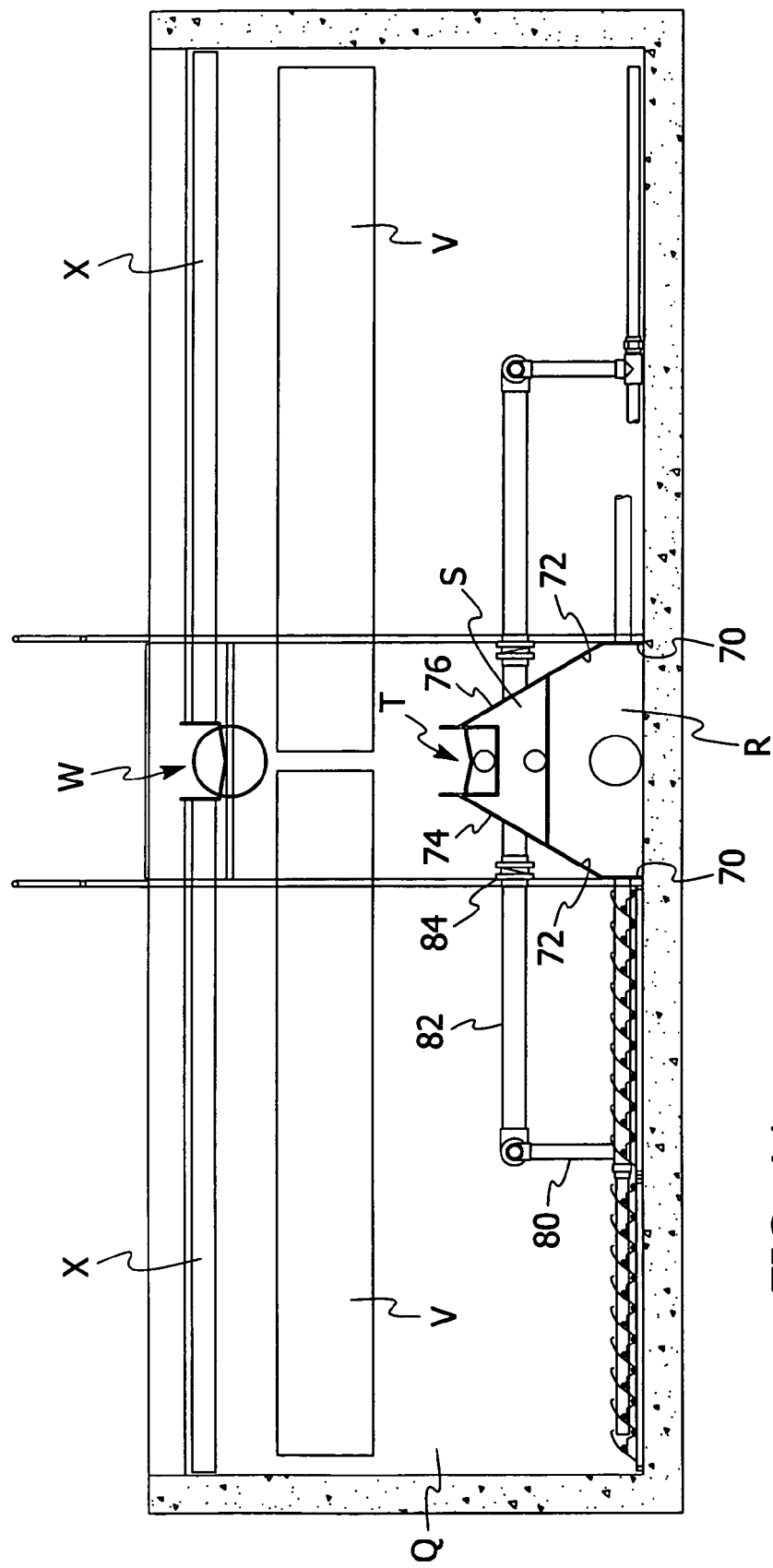
FIG. 11 is a cross-sectional view taken along lines 11-11 illustrated in FIG. 10.

FIGS. 9 to 11

Referring to FIGS. 9 to 11, a filter system P for filtering water and/or wastewater formed in accordance with another preferred embodiment of the present invention is illustrated in one of many possible configurations. Filter system P is similar to filter system A, and, therefore, only the differences with be explained in detail.

The principal difference between filter system P and filter system A is size. Filter system P is a 3 MGD filter and, therefore, is considerably larger than filter system A. Referring to FIGS. 9 and 11, filter system P includes a clarifier compartment Q having an influent distribution chamber R, a sludge collection chamber S and a concentrator T. Unlike, filter system A, influent distribution chamber R, sludge collection chamber S and concentrator T are centrally located in the clarifier compartment Q. Both sidewalls of influent distribution chamber R include a vertical section 70 and an inclined section 72. As previously explained, the cross-sectional area of the corresponding portions of clarifier compartment Q increases in the inclined sections 72 in turn causing the velocity of influent to decrease. The benefits of this velocity change were previously explained in detail. Sidewalls 74 and 76 of the sludge collection chamber S are inclined to achieve a further velocity change in the corresponding portions of clarifier compartment Q.

A row of eight flocculator modules U are disposed on each side of the influent distribution chamber R. Flocculator modules U are of the same construction as flocculator modules H of filter system A. A plurality of settling plates V are disposed above each flocculator module U. An effluent trough W is centrally located in compartment Q and extends substantially the length thereof. An effluent collector X is disposed above each of the sets of settling plates V to collect effluent and direct the same into effluent trough W.

The methods of filtering and cleaning the various components of filter system P are similar to those described in connection with filter system A. However, it will be readily appreciated that influent passing into influent chamber is simultaneously directed into both banks of flocculator modules U. Further, sludge blankets will form above each of the banks of eight flocculator modules U.

Sludge collection headers Y of adjacent flocculator modules U are connected by substantially U-shaped piping runs 80. A conduit 82 is associated with each piping run 80 to connect the piping run 80 to sludge collection chamber S. Each conduit 82 has a valve 84. Therefore, sludge may be removed from only predetermined portions of the clarifier compartment Q by opening only one or a selected number of valves 84 during the sludge removal process. However, it will be readily appreciated that all valves 84 may be opened at any given time to remove sludge from all sections of clarifier compartment Q.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. A sludge blanket clarifier for removing at least some impurities from influent, said sludge blanket clarifier comprising:
    (a) a clarifier compartment in which a sludge blanket is to be formed to remove at least some impurities from influent directed into said clarifier compartment and through the sludge blanket, said clarifier compartment having at least one vertical sidewall extending from a bottom of said clarifier compartment to a top of said clarifier compartment;
    (b) said clarifier compartment having a cross-sectional area that varies over at least a portion of a height of said clarifier compartment such that the velocity of influent just prior to entry into the sludge blanket is less than the velocity of influent just after entering said clarifier compartment;
    (c) an inlet conduit operably associated with said clarifier compartment for directing influent into said clarifier compartment and an effluent collector for collecting effluent, and (d) said clarifier compartment including a first chamber, said first chamber is one of an influent distribution chamber and a sludge collection chamber, said first chamber has a varying width such that said clarifier compartment has a cross-sectional area that varies over a first portion of a height of said clarifier compartment.

2. A sludge blanket clarifier as set forth in claim 1, wherein:
    (a) said clarifier compartment is an upflow filter.

3. A sludge blanket clarifier as set forth in claim 1, wherein:
    (b) said first chamber is an influent distribution chamber.

4. A sludge blanket clarifier as set forth in claim 1, wherein:
    (a) said first chamber is a sludge collection chamber.

5. A sludge blanket clarifier as set forth in claim 1, wherein:
    (a) said clarifier compartment has a substantially rectangular cross-section.

6. A sludge blanket clarifier as set forth in claim 1, further including:
    (a) a plurality of settling members disposed in said clarifier compartment.

7. A sludge blanket clarifier as set forth in claim 6, wherein:
    (a) said plurality of settling members are one of tube settlers and plate settlers.

8. A sludge blanket clarifier as set forth in claim 6, wherein:
    (a) said plurality of settling members are disposed above a position at which the sludge blanket is to form.

9. A sludge blanket clarifier for removing at least some impurities from influent, said sludge blanket clarifier comprising:
    (a) a clarifier compartment in which a sludge blanket is to be formed to remove at least some impurities from influent directed into said clarifier compartment and through the sludge blanket, said clarifier compartment having a cross-sectional area that varies over at least a first portion of a height of said clarifier compartment such that the velocity of influent just prior to entry into the sludge blanket is less than the velocity of influent just after entering said clarifier compartment;
    (b) a plurality of influent distribution conduits being disposed in said clarifier compartment for directing influent to the sludge blanket;
    (c) an effluent collector for collecting effluent, and (d) said clarifier compartment including a first chamber, said first chamber is one of an influent distribution chamber and a sludge collection chamber, said first chamber has a varying width such that said clarifier compartment has a cross-sectional area that varies over a first portion of a height of said clarifier compartment.

10. A sludge blanket clarifier as set forth in claim 9, further including:
    (a) a sludge concentrator disposed in said clarifier compartment for removing excess sludge from the sludge blanket.

11. A sludge blanket clarifier as set forth in claim 10, further including:
    (a) a sludge recycle pump operably associated with said sludge concentrator and said plurality of influent distribution conduits for directing sludge collected in said sludge concentrator through said plurality of influent distribution conduits to seed the sludge blanket.

12. A sludge blanket clarifier as set forth in claim 10, further including:
    (a) at least one sludge collection lateral disposed in said clarifier compartment adjacent a bottom portion of said clarifier compartment; and,
    (b) a sludge collection chamber disposed in said clarifier compartment, said sludge collection chamber is operably associated with said sludge collection lateral such that sludge collected by said sludge collection lateral is directed into said sludge collection chamber.

13. A sludge blanket clarifier as set forth in claim 9, further including:
   (a) an influent distribution chamber disposed in said clarifier compartment, said plurality of influent distribution conduits being operably associated with said influent distribution chamber, said influent distribution chamber has a varying width such that said clarifier compartment has a cross-sectional area that varies over at least a first portion of a height of said clarifier compartment such that the velocity of influent just prior to entry into the sludge blanket is less than the velocity of influent just after entering said clarifier compartment.

14. A sludge blanket clarifier as set forth in claim 9, wherein:
   (a) the varying cross-sectional area of said clarifier compartment is formed at least in part from a pre-existing clarifier compartment that did not include a varying cross-sectional area and a influent distribution chamber configured to be retrofitted into said pre-existing clarifier compartment where said influent distribution chamber has a varying width and once installed in said pre-existing clarifier compartment provides said pre-existing clarifier compartment with a varying cross-sectional area.

15. A sludge blanket clarifier for removing at least some impurities from influent, said sludge blanket clarifier comprising:
   (a) a clarifier compartment in which a sludge blanket is to be formed to remove at least some impurities from influent directed into said clarifier compartment and through the sludge blanket, said clarifier compartment having a bottom wall;
   (b) an influent distribution chamber disposed in said clarifier compartment, said influent distribution chamber has a varying width to cause the velocity of influent to vary in said clarifier compartment over at least a portion of the height of said influent distribution chamber, a portion of said bottom wall of said clarifier compartment forming a wall of said influent distribution chamber;
   (c) at least two influent distribution conduits operably associated with said influent distribution chamber for distributing influent through said clarifier compartment, and;
   (d) an effluent collector for collecting effluent.

16. A sludge blanket clarifier as set forth in claim 15, further including:
   (a) a sludge collection lateral disposed in said influent distribution chamber to remove sludge collected in said influent distribution chamber.

17. A sludge blanket clarifier as set forth in claim 15, further including:
   (a) at least one sludge collection lateral disposed in said clarifier compartment; and,
   (b) a sludge collection chamber operably connected to said sludge collection lateral for receiving sludge collected by said sludge collection lateral, said sludge collection chamber being configured to cause the velocity of influent to vary over at least a portion of the height of said sludge collection chamber.

18. A sludge blanket clarifier for removing at least some impurities from influent, said sludge blanket clarifier comprising:
   (a) a clarifier compartment in which a sludge blanket is to be formed to remove at least some impurities from influent directed into said clarifier compartment and through the sludge blanket;
   (b) a plurality of influent distribution conduits for directing influent to the sludge blanket, said plurality of influent distribution conduits being disposed in said clarifier compartment;
   (c) a plurality of sludge collection conduits for removing sludge from said clarifier compartment, said plurality of sludge collection conduits being disposed in said clarifier compartment;
   (d) an inlet conduit for directing influent into said clarifier compartment, said inlet conduit being operably associated with at least one of said plurality of sludge collection conduits for directing influent through at least one of said plurality of sludge collection conduits; and,
   (e) an effluent collector for collecting effluent.

19. A sludge blanket clarifier as set forth in claim 18, further including:
   (a) a plurality of flexible flocculator members, at least one of said plurality of flexible flocculator members is associated with each of said plurality of influent distribution conduits, said plurality of sludge collection conduits being disposed below said plurality of influent distribution conduits.

20. A sludge blanket clarifier for removing at least some impurities from influent, said sludge blanket clarifier comprising:
   (a) a clarifier compartment in which a sludge blanket is to be formed to remove at least some impurities from influent directed into said clarifier compartment and through the sludge blanket;
   (b) a flocculator module disposed in said clarifier compartment, said flocculator module having at least one influent distribution member operably associated with a flexible flocculator baffle, said flexible flocculator baffle being configured such that when initially impacted with influent from said influent distribution member at least a portion of said flexible flocculator baffle moves to aid in flocculation; and
   (c) an effluent collector for collecting effluent.

21. A sludge blanket clarifier as set forth in claim 20, wherein:
   (a) said flocculator module further includes at least one sludge collection lateral, said sludge collection lateral being disposed below said at least one influent distribution member.

22. A sludge blanket clarifier as set forth in claim 20, wherein:
   (a) said flocculator module has a plurality of influent distribution members, a plurality of flexible flocculator baffles and a plurality of sludge collection laterals.

23. A sludge blanket clarifier as set forth in claim 20, wherein:
   (a) said flexible flocculator baffle is disposed relative to said at least one influent distribution member such that a horizontal plane passing through said influent distribution member passes through at least a portion of said flexible flocculator baffle.

24. A sludge blanket clarifier as set forth in claim 20, furthering comprising:
   (a) a pulsator for introducing influent into said clarifier compartment with a pulsing action to cause greater movement of said flexible flocculator baffle.

25. A sludge blanket clarifier for removing at least some impurities from influent, said sludge blanket clarifier comprising:

(a) a clarifier compartment in which a sludge blanket is to be formed to remove at least some impurities from influent directed into said clarifier compartment and through the sludge blanket;
(b) an influent chamber disposed in said clarifier compartment for receiving influent to be filtered and distributing the influent throughout said clarifier compartment;
(c) a sludge collection chamber disposed in said clarifier compartment for collecting sludge removed from a bottom of said clarifier compartment, said sludge collection chamber being disposed above said influent chamber, wherein one of said influent chamber and sludge collection chamber has a varying width such that said clarifier compartment has a cross-sectional area that varies over a first portion of a height of said clarifier compartment;
(d) a concentrator disposed in said clarifier compartment for receiving excess sludge from the sludge blanket; and
(e) an effluent collector for collecting effluent.

26. A sludge blanket clarifier as set forth in claim 25, further including:
(a) a plurality of flocculator modules disposed in said clarifier compartment, each of said plurality of flocculator modules include a plurality of influent distribution members operably associated with an influent collection header, a plurality of flexible flocculator baffles and a plurality of sludge collection laterals operably associated with a sludge collection header.

27. A sludge blanket clarifier as set forth in claim 26, further including:
(a) a conduit connecting the sludge collection header of one of said plurality of flocculator modules with the sludge collection header of another one of said plurality of flocculator modules.

28. A sludge blanket clarifier for removing at least some impurities from influent, said sludge blanket clarifier comprising:
(a) a clarifier compartment in which a sludge blanket is to be formed to remove at least some impurities from influent directed into said clarifier compartment and through the sludge blanket;
(b) an influent inlet conduit operably associated with said clarifier compartment for directing influent to be filtered into said clarifier compartment;
(c) a sludge collection member disposed in said clarifier compartment for collecting unwanted sludge from said clarifier compartment;
(d) a sludge discharge conduit operably associated with said sludge collection member for discharging sludge collected by said sludge collection member from said clarifier compartment;
(e) at least one connection conduit connecting said sludge discharge conduit to said influent inlet conduit and at least one valve operably associated with said connection conduit such that when said at least one valve is in a first position at least a portion of influent flowing through said influent inlet conduit is directed through said connection conduit, said sludge discharge conduit and said sludge collection member to free any blockages in said sludge discharge conduit and said sludge collection member; and
(f) an effluent collector for collecting effluent.

29. A sludge blanket clarifier for removing at least some impurities from influent, said sludge blanket clarifier comprising:
(a) a clarifier compartment in which a sludge blanket is to be formed to remove at least some impurities from influent directed into said clarifier compartment and through the sludge blanket, said clarifier compartment including an influent inlet conduit and a sludge outlet conduit;
(b) a plurality of influent distribution conduits for directing influent to the sludge blanket, said plurality of influent distribution conduits being disposed in said clarifier compartment;
(c) a plurality of sludge collection conduits for removing sludge from said clarifier compartment, said plurality of sludge collection conduits being disposed in said clarifier compartment;
(d) a connecting conduit for connecting said influent inlet conduit and said sludge outlet conduit, a valve operably associated with said connecting conduit for directing fluid between said influent inlet conduit and said sludge outlet conduit when said valve is open and preventing fluid from flowing between said influent inlet conduit and said sludge collection conduit when said valve is closed; and,
(e) an effluent collector for collecting effluent.

\* \* \* \* \*

UNITED STATES PATENT AND TRADEMARK OFFICE
CERTIFICATE OF CORRECTION

| | | |
|---|---|---|
| PATENT NO. | : 7,927,485 B2 | |
| APPLICATION NO. | : 12/155287 | |
| DATED | : April 19, 2011 | |
| INVENTOR(S) | : R. Lee Roberts, Mark Kevin Addison and Karl Michael Kyriss | |

It is certified that error appears in the above-identified patent and that said Letters Patent is hereby corrected as shown below:

Detailed Description of the Preferred Embodiments of the Invention, Figs. 1-8, Column 7, line 66, "laterals 34 positioned are" should be -- laterals 34 are --

Signed and Sealed this
Twenty-third Day of August, 2011

David J. Kappos
*Director of the United States Patent and Trademark Office*